US 9,289,805 B2

(12) United States Patent
Bagnoli (10) Patent No.: US 9,289,805 B2
(45) Date of Patent: Mar. 22, 2016

(54) PLANT FOR TREATING DRILLING MUDS

(71) Applicant: Soilmec S.p.A., Cesena (FC) (IT)

(72) Inventor: Davide Bagnoli, Forli (IT)

(73) Assignee: Soilmec S.p.A., Cesena (FC)

( * ) Notice: Subject to any disclaimer, the term of this patent is extended or adjusted under 35 U.S.C. 154(b) by 656 days.

(21) Appl. No.: 13/650,483

(22) Filed: Oct. 12, 2012

(65) Prior Publication Data

US 2013/0092619 A1    Apr. 18, 2013

(30) Foreign Application Priority Data

Oct. 13, 2011   (IT) ................ TO2011A0909

(51) Int. Cl.
| | |
|---|---|
| *B09C 1/00* | (2006.01) |
| *E21B 21/06* | (2006.01) |
| *B01D 21/26* | (2006.01) |
| *B04C 7/00* | (2006.01) |

(Continued)

(52) U.S. Cl.
CPC ... *B09C 1/00* (2013.01); *B03B 9/00* (2013.01); *B04C 7/00* (2013.01); *B04C 9/00* (2013.01); *E21B 21/06* (2013.01); *E21B 21/065* (2013.01); *E21B 21/068* (2013.01); *B01D 21/262* (2013.01); *B01D 21/267* (2013.01); *B04C 2009/002* (2013.01)

(58) Field of Classification Search
CPC ........ B01D 17/08; B01D 17/12; B01D 21/26; B01D 21/262; B01D 21/265; B01D 21/267; B01D 21/305; B01D 21/32; B01D 21/34; B01D 33/0361; B01D 33/03; B01D 36/003; B01D 36/02; B01D 36/04; B01D 36/045; B09C 1/00; B09C 1/02; B09C 1/08; E21B 21/06; E21B 21/063; E21B 21/065; E21B 21/066; E21B 21/068; B04C 5/28; B04C 5/30; B04C 7/00; B04C 9/00; B04C 11/00; B04C 2009/002; B04B 5/10; B03B 7/00; B03B 9/00

See application file for complete search history.

(56) References Cited

U.S. PATENT DOCUMENTS

| | | | | |
|---|---|---|---|---|
| 2,955,753 | A | * | 10/1960 | O'Conor et al. ................. 494/5 |
| 3,964,557 | A | * | 6/1976 | Juvkam-Wold ................. 175/66 |
| 4,571,296 | A | * | 2/1986 | Lott ............................... 209/17 |

(Continued)

FOREIGN PATENT DOCUMENTS

WO    WO 89/09091 A1    10/1989

OTHER PUBLICATIONS

Authorized officer Willem van der Zee, Search Report in IT TO20110909, May 15, 2012, 2 pages.

*Primary Examiner* — David C Mellon
(74) *Attorney, Agent, or Firm* — Fish & Richardson P.C.

(57) ABSTRACT

A plant for treating drilling muds, which can be installed in building sites for performing excavations or foundations, includes a main mud storage tank containing clean mud ready to be conveyed to the same excavation, a first grizzly screen, a mud processing hopper, at least one cyclone stage provided with at least an inlet in which entering mud to be treated is introduced and with at least a first outlet from which lightened mud (Fa) exits having a lower density than the entering mud, and with at least a second outlet from which a high density mud (Fd) exits, such high density mud having a higher density than the entering mud, and a dewatering screen. Said devices are connected together through pipes in such a way that a mud filled with detritus coming from the excavation is treated in order to be able to be reused once it is returned to the excavation.

20 Claims, 3 Drawing Sheets

(51) Int. Cl.
*B04C 9/00* (2006.01)
*B03B 9/00* (2006.01)

(56) References Cited

U.S. PATENT DOCUMENTS

| | | | |
|---|---|---|---|
| 4,781,671 A * | 11/1988 | Pober | B03B 5/00 |
| | | | 209/5 |
| 5,090,498 A * | 2/1992 | Hamill | 175/206 |
| 5,132,024 A * | 7/1992 | Hulbert | B01D 17/0214 |
| | | | 209/499 |
| 5,494,584 A * | 2/1996 | McLachlan | E21B 21/065 |
| | | | 175/206 |
| 5,814,230 A * | 9/1998 | Willis | B01D 21/12 |
| | | | 166/267 |
| 6,322,489 B1 | 11/2001 | Richardson et al. | |
| 6,607,659 B2 * | 8/2003 | Hensley et al. | 210/87 |
| 7,540,837 B2 | 6/2009 | Scott et al. | |
| 2004/0016572 A1 * | 1/2004 | Wylie | E21B 21/062 |
| | | | 175/66 |
| 2004/0069536 A1 | 4/2004 | Cowan | |
| 2010/0126936 A1 * | 5/2010 | Jones | E21B 21/063 |
| | | | 210/708 |

* cited by examiner

PLANT FOR TREATING DRILLING MUDS

CLAIM OF PRIORITY

Under 35 U.S.C. §119, this application claims the benefit of a foreign priority application filed in Italy, serial number TO2011A 000909, filed Oct. 13, 2011.

TECHNICAL FIELD

The present invention concerns a plant for the treatment of muds used in the steps of drilling and making foundations, for making panels using a hydromill, or for making blades with reverse circulation technology.

BACKGROUND

It is known that mud treatment plants are in a closed loop, in order to reduce the amount of water used to make the mud and consequently reduce costs. Such a mud treatment plant must adhere to predetermined environmental pollution restrictions.

Normally, mud treatment plants should treat the mud in such a way that it can carry out the following useful functions for drilling:
 stabilizing the walls of the excavation thanks to hydrostatic thrust, linked to the density of the mud;
 limiting the losses of mud in the excavation by permeation acting as a transportation medium for the detritus during drilling through the use of known pumping systems;
 lubricating and cooling the drilling tool.

It is known, moreover, that the optimal density value of the mud is around 1.10 t/m$^3$, at the maximum 1.15 t/m$^3$.
 The use of muds with higher densities is problematic since:
 greater powers are required for the centrifugal pumps generally used for the evacuation of the detritus, increasing the costs for making the excavation;
 such muds tend to more easily sediment on the surfaces of the excavation creating a deposit generally known as "cake" that must be removed at the end of the excavation in order not to jeopardise the hydraulic seal and/or increase the permeability of the foundation;
 it does not allow the casting of concrete directly in the foundation because the small difference in density with respect to concrete could cause mud to be incorporated inside the product jeopardising its strength and permeability.

The muds used in excavations are generally mixtures of water and bentonite and possible polymers, with dosage of about 30-50 kg of bentonite for every m$^3$ of water.

The main function of said bentonite and polymers is to increase the density of the mud at the same time increasing their stabilizing effect for the walls of the excavation. Moreover, such clean mud, when it deposits on the walls, fills possible pores and small fractures in the ground, limiting the loss of the mud itself during drilling.

Once the drilling step is finished, normally, there is then the step of making the foundation. Generally, the concrete is cast inside the excavation to make the foundation. The casting of the concrete is carried out leaving the mud in the excavation. The concrete is carried inside the excavation through special pipes that allow it to rise, gradually replacing the bentonite mud, thanks to the difference in density, said mud being recovered from the surface, regenerated and stored for subsequent drilling.

The muds contained in the excavation during the step of making the foundation must have a density of less than 1.15 t/m$^3$ and a sand content of less than 4% since, in the case of higher sand concentrations, the quality of the end product would not meet the required standards, with possible inclusions and consequent problems, like for example structural yielding.

It is also important that, for the purposes of the foundation, the mud has a low slime and clay content. Such slimes and clays, indeed, tend to deposit on the walls of the excavation generating an excessive thickness that can jeopardise some physical characteristics of the foundation. Such a phenomenon is very harmful when making adjacent rectangular panels, jeopardising the hydraulic seal of the structure.

Normally, during drilling, the mud that is recovered from the excavation, containing drilling detritus, is sent to the treatment plant. In such a treatment plant, such muds are purified of the coarsest detritus and as far as possible of finer detritus.

It is known that sands have a particle size of more than 74 µm; slimes have a particle size of between 74 and 2 µm and clays, finer still, have a particle size of less than 2 µm.

Figure 1:
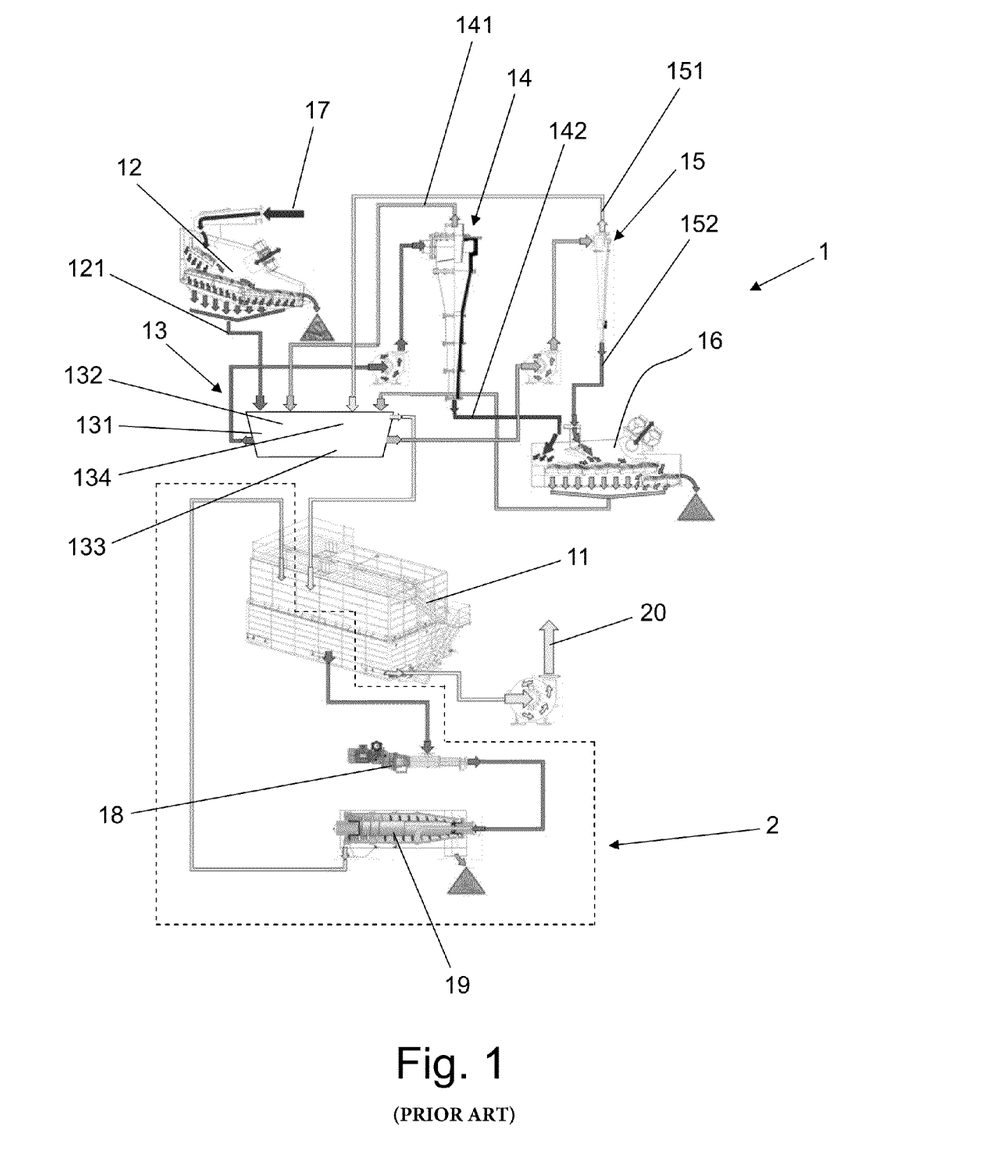
FIG. 1 illustrates a system of the prior art.

In order to perform these functions the plants currently in use consist of two plants in parallel, as illustrated in the attached FIG. 1.

FIG. 1 illustrates in detail a main plant (1) comprising a first portion of plant, which in turn comprises:
 a main mud storage tank (11), containing the mud ready to be sent to the excavation;
 a mud treatment plant comprising a first grizzly screen (12), a mud processing hopper (13), a first cyclone stage (14) and a second cyclone stage (15) and, finally, a dewatering screen (16).

The mud indicated by an arrow (17) arrives full of detritus, is treated in order to be able to be reused and goes back to the excavation as indicated by the arrow (20). Up to now this plant only manages to correctly separate larger sized detritus and sand from the mud, but it is not very effective for finer substances dissolved in the mud such as slime and clay.

Such a first plant also comprises a second tank with clean mud, not represented in the figures, which is inserted into the excavation before carrying out the casting of concrete in the step of making the foundation, to be certain of carrying out the casting for the foundation with a mud that is as clean as possible and with the correct concentration of sand.

A second portion of plant (2) in parallel with the first portion of plant quoted above, comprises a pump (18) that takes mud from the main tank (11) and sends it to a first machine (19), normally known as centrifuge, capable of separating the finer parts like slime and clay from the mud. This particular plant is called centrifugal plant since the mud is centrifuged at very high speed in order to be able to gravimetrically separate the solid particles suspended in the water.

The mud, arriving from the drilling, on average has a density of about 1.3 t/m$^3$ The grizzly screen (12), generally, exploiting vibrating screens, separates the coarser detritus, like for example pieces of rock or gravel, from the mud arriving from the drilling. The flow rate of mud (121) coming out from the grizzly screen (12), with a density of about 1.25 t/m$^3$, is conveyed into the mud processing hopper (13). The mud processing hopper (13) is generally divided into many volumes. From a compartment of this hopper the mud is pumped to the first cyclone stage.

In such a first cyclone stage there is a separation of the sand from the mud. Normally, in output from the cyclones (14) there is a mud having intermediate density (141), about 1.18 t/m$^3$. Such mud comes out from the cyclone (14) in the upper part and is conveyed into the mud processing hopper (13); on the other hand, exiting in the lower part from the cyclone (14), there is a mud (142) that is very dense and very full with sand that is conveyed to the dewatering screen (16) in order to reduce the amount of water from the muds produced making them shovelable.

Normally, the cyclone stage can also comprise more than one cyclone, connected in parallel to one another. Every cyclone can also be in vertical position or in inclined configuration, still keeping the outlet of the light mud in their upper part and the outlet of the heavy mud, filled with separated solid, in the lower part.

The mud having intermediate density, taken from the mud processing tank (13) is conveyed to the second cyclone stage (15). In such a stage (15) a light mud (151) with a density of about 1.15 t/m$^3$ is separated, coming out from its upper part and being conveyed to the mud processing hopper (13) and then to the main storage tank (11). The second cyclone stage manages to separate mainly slime and partially clay from the mud. When exiting, in the lower part of said second cyclone stage, there is a flow rate of high density mud (152), oscillating between 1.2 t/m$^3$ and 1.5 t/m$^3$, which is conveyed to the dewatering screen (16).

The centrifugal plant (2), installed in parallel, has the task of taking mud from the main tank (11) already treated by the plant (1) described previously. Inside the centrifuge the mud is lightened, reducing its density gravimetrically, thanks to the separation of part of the solid fraction suspended in it. The treated mud is conveyed into the main tank (11) with a density of about 1.08 t/m$^3$.

Normally, the flow rates that a single centrifuge (19) can manage, depending on its size, internal geometry and the density of the mud going in, are variable between 15 and 50 m$^3$/h; whereas the flow rate arriving from the excavation towards the main plant (1) can vary between 300 and 450 m$^3$/h. Generally, a single centrifuge is not sufficient to keep the content of fine solids, such as slime and clay, contained in the muds under control and therefore, in some cases, it is necessary to use more than one centrifuge, all in parallel with respect to the main plant (1).

Using a single centrifuge (19), in the case of ground very full of fine solids, a mud would be obtained whose density increases as the working days goes on. Such an increase in density is caused by the fact that the plant with centrifuge (2) cannot extract a sufficient quantity of fine solids from the mud since the centrifuges currently used have the possibility of processing lower flow rates of mud than those involved in the field of foundations as quoted above. Known plants, therefore, use many centrifuges for every drilling machine, with a negative impact on the plant costs, maintenance and bulk.

If a plant were used without centrifuge in the presence of ground with slime and clay, during normal operation there would be a continuous increase in density of the mud since it is not possible to separate slime and clay with a simple mud treatment plant.

In known plants, in the absence of a centrifugal plant, after a few days of work, the density of the mud would reach values of about 1.25 t/m$^3$ making drilling difficult. In this last plant configuration it is therefore necessary to periodically dispose of a portion of mud and reintegrate it with bentonite fresh mud and/or clean industrial water.

Figure 2:
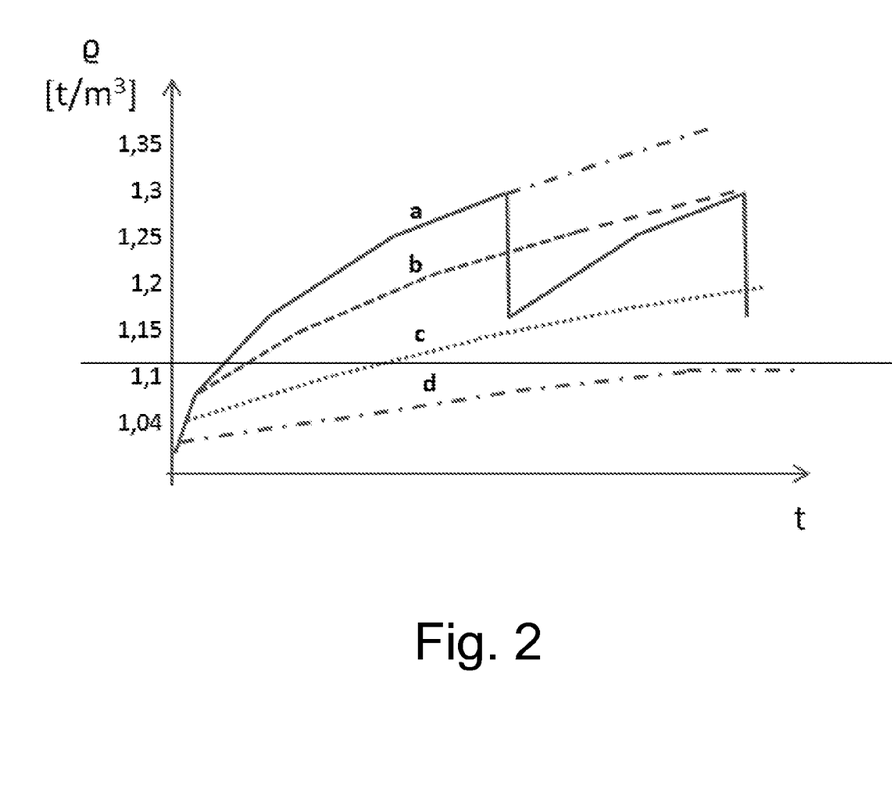
FIG. 2 shows a graph of the density of the drilling mud as a function of the time comparing the systems of the prior art with the system according to the present invention, respectively the curve "a" shows a system without centrifugal plant; the curve "b" shows a conventional system with a single centrifuge; the curve "c" shows the plant with a plurality of centrifuges in parallel; the curve "d" shows the plant according to the present invention.

In the attached FIG. 2, the curve referred to as "a", illustrates the quality progression of the density of the mud in plants without centrifuge as the days pass.

Normally, the disposal of the muds is a big problem in building sites since it has a high cost.

Moreover, it is known that it is necessary to refill with mud, of a more modest amount, due to the fact that a part thereof permeates through the walls of the excavation due to an imperfect seal of the walls themselves. Such a loss, if not refilled, would cause a further concentration of fine material in the process mud.

Again in FIG. 2, in comparison to the curve "a" there is the progression of the density of a mud of a plant in which a centrifuge has been added in parallel. Such a curve "b" shows that the problem is only delayed, reaching a critical density after a longer time. Finally, the curve "c", of FIG. 2, shows the progression of the density of the mud in plants comprising many centrifuges in parallel. It can be seen that the problem of reaching a critical density is further delayed but without ever solving it definitively.

The plants present in the prior art foresee to carry out the periodic disposal of amounts of muds full with fine material and reintegrating it with fresh bentonite mud and/or clean industrial water.

Moreover, it is known that the use of many centrifuges has a very high cost and requires large spaces to fit them on the building site, which can be problematic in building sites located in heavily urbanised areas.

From U.S. Pat. No. 7,540,837 B2 a mud treatment plant is known for the field of oil drilling, comprising a control system that in turn comprises viscosity and density sensors positioned inside the main storage tank. Depending on the data obtained from said sensors, the operation of the centrifuge that draws and conveys fluid from the tank itself is adjusted.

Such a patent describes an embodiment of the system in which part of the solids separated through centrifuge are reinserted into the main tank to keep the viscosity and the density of the fluid at a desired level, in the case in which it becomes too low.

The solutions described by the aforementioned patent do not solve the problems quoted earlier and, moreover, it tries to solve the problem of increasing the density of a mud that is not very dense. The problem of using a mud that is not very dense to make the foundations, in general, never occurs, since, as stated above, the density of the mud tends to increase as the excavation proceeds.

Moreover, the centrifuge takes mud from the main tank, which does not have controlled characteristics of density and presence of residues.

Finally, in the plants described up to now, the operation of the centrifuge is only optimised if the muds inside the main storage tanks (11) are properly homogenised and the variations in density entering the centrifuge are gradual.

SUMMARY

The present invention proposes to solve the aforementioned problems by making a plant for the treatment of drilling muds, comprising a single centrifuge, which only requires modest periodic refills of mud normally caused by the inevitable permeation through the walls of the excavation. Such an invention makes it possible to reduce the initial cost for physically making the plant, and the cost for managing the muds, having to refill only small quantities of fluid and without having the need to dispose of mud. Moreover, it makes it possible to keep the density controlled and below the quality limit of use in drilling. As a result of this there is a substantial reduction in the environmental impact of drilling.

An aspect of the present invention concerns a plant for the management of drilling muds, with the characteristics of the attached independent claim 1.

The accessory characteristics are given in the attached dependent claims.

The characteristics and advantages of the system according to the present invention will become clearer from the following description of an embodiment, and from the attached figures, which specifically illustrate:

DETAILED DESCRIPTION

Figure 3:
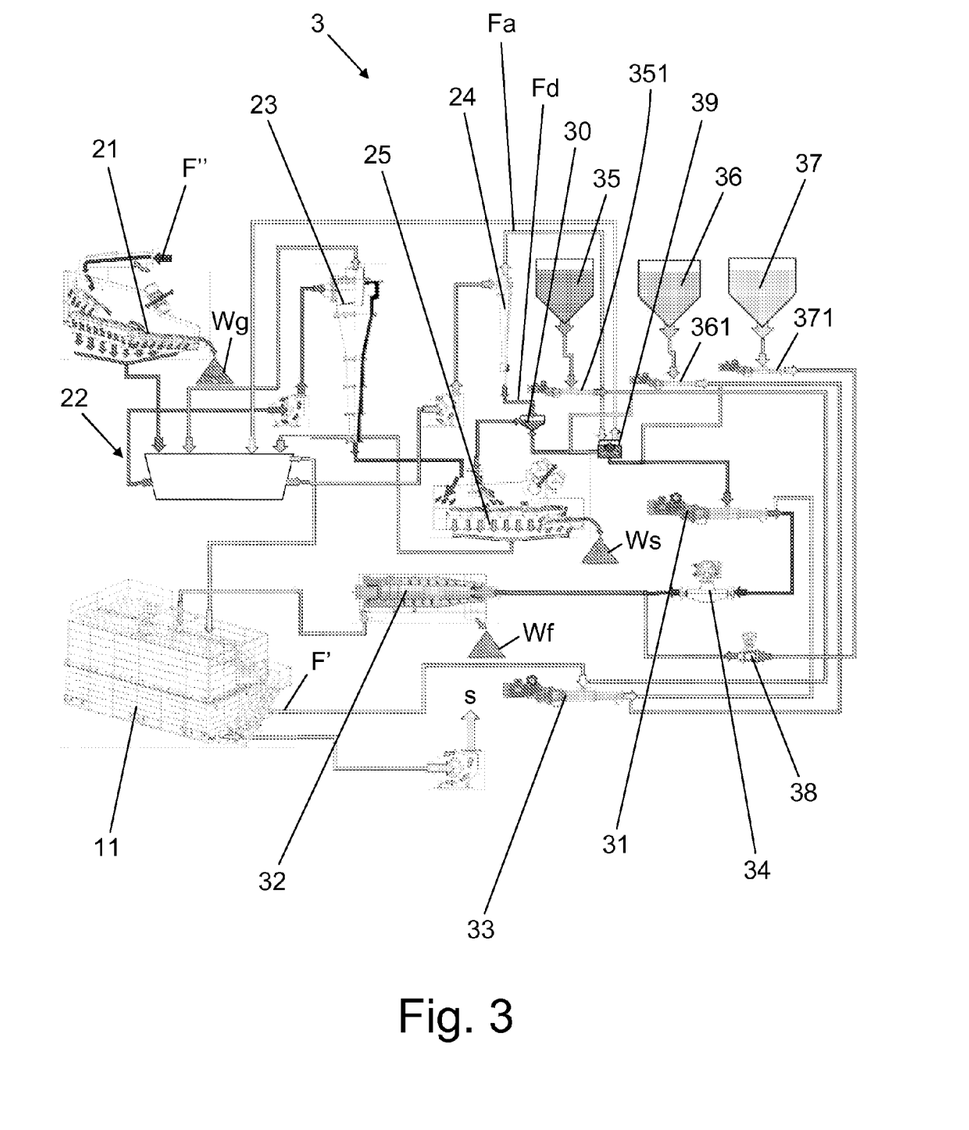
FIG. 3 schematically illustrates the plant according to the present invention.

With reference to FIG. 3 the plant 3 for treating drilling muds, installed in building sites, for performing excavations or foundations, comprising a main mud storage tank 11, containing the clean mud "F'" ready to be conveyed to the excavation "S".

The plant 3 comprises a first grizzly screen 21; a mud processing hopper 22, at least one cyclone stage, preferably a first cyclone stage 23 and a second cyclone stage 24, and a dewatering screen 25.

Such devices are connected, through pipes, so that a mud filled with detritus "F''" coming from the excavation "S", is treated in order to be able to be reused going back to the same excavation "S".

Every cyclone stage (23, 24) comprises:
at least one inlet in which a mud to be treated is inserted
at least one first outlet from which a lightened mud (Fa) with lower density than the mud going in comes out,
at least one second outlet from which a high density mud (Fd) with greater density than the mud going in comes out.

In a preferred non-limiting embodiment of the plant 3, the high density mud "Fd" coming out from said second outlet arranged in the lower part, commonly called "underflow", normally intended for said dewatering screen 25 is picked up by the second cyclone stage 24, and sent towards a centrifuge 32. In alternative embodiments, the picking up can be carried out both after the first stage and after possible addition cyclone stages, as well as by a combination of these.

In a non-limiting embodiment, in a first portion of pipes, comprised between said second cyclone stage 24 and said centrifuge 32, there is at least one first compensation manifold 30 adapted for containing the high density mud "Fd" coming out from the second cyclone stage 24.

In the embodiment illustrated in FIG. 3, such a high density mud "Fd" coming out from the second outlet of said second cyclone stage 24, instead of being conveyed directly to the dewatering screen 25, is picked up downstream of the second cyclone stage and is conveyed to said first compensation manifold 30, adapted for containing this type of mud. The high density mud "Fd" can be picked up immediately as it leaves the cyclones comprised in said second cyclone stage 24, or also a certain distance along the pipe. Preferably, the picking up of high density mud "Fd" is carried out immediately at the outlet of the cyclones to avoid clogging of the mud due to decanting. Said first manifold 30 is structured essentially like a tank and from the bottom of the same compensation manifold 30 the high density mud "Fd" is picked up, to be conveyed to the centrifuge 32. Thus the high density mud "Fd" before entering into the centrifuge does not undergo intermediate screening treatments.

In other words, the high density mud enters directly into the centrifuge in the absence of intermediate screening treatments between the cyclone stage 23,24 and the centrifuge itself.

In the case in which the first manifold 30 has reached a predetermined maximum level of high density mud "Fd" inside it, the exceeding part of this mud is conveyed, like in classic plants, to the dewatering screen 25.

Normally, as well as the high density mud "Fd" coming from said second cyclone stage 24, through a first pump 31, the clean mud "F'" coming from said main mud storage tank 11 also reaches said centrifuge 32, through a second pump 33.

Through said second pump 33, the clean mud "F'" from the main tank 11 is preferably conveyed to the same delivery of said first pump 31. Such two types of mud (F' and Fd) mix together, both reaching the centrifuge 32 in known and predetermined proportions, so as to control and counteract the variations in density when entering the centrifuge 32. The suction of said first pump 31 or second pump 33 can, in an embodiment that has not been illustrated, pick up clean water to be mixed with the mud, in the case for example in which the density of the high density mud "Fd" is excessive. It is also possible, in an embodiment that has not been illustrated, to pick up the aforementioned clean water from a pressurised line present on the building site.

Such clean water is picked up from the water mains where the building site is located or from cisterns provided for storing water.

On the delivery of the aforementioned first pump 31 and second pump 33 there is at least one first measuring device 34, adapted for measuring the actual flow rate entering into the centrifuge 32. Such a device 34 is also adapted for measuring other important characteristics of the mud, like for example density, viscosity and particle size range. Such a measuring device 34 can be made up of one or more independent measuring instruments.

Said first measuring device 34 is managed through a computer-based control system, not illustrated, adapted for deciding, depending on data received from the same first measuring device 34, how much high density mud "Fd" has to be drawn from said second cyclone stage 24 and how much clean mud "F'" has to be drawn from the main mud storage tank 11, acting on the respective first pump 31 and second pump 32, varying their flow rate. Such controlled mixing of the high density mud "Fd" and of the clean mud "F'" is such as to ensure insertion, inside the centrifuge 32, of a type of mud with the optimal density, for operation of the centrifuge 32 at maximum performance, so that it can separate as much solid waste as possible from the mud.

In this way it is possible to generate a stable operating point for the centrifuge 32, despite the variability of the mud arriving from the drilling for making the excavation "S".

Indeed, the plant according to the present invention makes it possible to insert inside the centrifuge 32 a type of mud with the optimal density in order to allow the centrifuge 32 to work in the optimal operating conditions.

Preferably, in the portion of pipes that is located between the second cyclone stage 24 and the first pump 31 there is a second device for lacking flow compensation 39. Said second compensation device 39 adapted for receiving a lightened mud "Fa" evacuated from the first outlet, arranged in the upper part of the same cyclone stage 24, or possibly from other stage arranged downstream. Normally, in the case of correct operation of the plant, from the second compensation device 39 the lightened mud "Fa" returns directly to the mud processing hopper 22. On the other hand, in the case of malfunction, for example of the second pump 33, or during maintenance when the flow rate of light mud "F'" from the second pump 33 is missing, the second compensating device 39 mixes the high density mud "Fd" and the lightened mud "Fa" still obtaining good performance of the centrifuge.

Such an invention can also be carried out without the presence of compensation manifolds (30 and 39), since the computer-based control system will continuously monitor and adjust the flow rates of the pumps 31 and 33 depending on the needs of the plant and of the centrifuge 32.

By inserting into the centrifuge 32 a mud having a density of about $1.2 \div 1.4$ t/m$^3$, for the same power and flow rate of the centrifuge, it is possible to separate from the mud a greater amount of clay, up to three times more than the case in which a mud with a density of about 1.12 t/m$^3$ is inserted inside the centrifuge 32.

This makes it possible to obtain a mud, to be used in drilling, with controlled and constant density, which can reach values of about 1.10 t/m$^3$. With reference to FIG. 2, the plant according to the present invention makes it possible to obtain a progression of the density of the mud following the progression of the curve referred to as "d" that tends to stabilize asymptotically at values of about 1.10 t/m$^3$. By controlling the flow rate of the pumps (31 and 33) it is possible to control the value of the density of the mud, increasing it or decreasing it as required.

A possible embodiment of the present invention, not illustrated, foresees to also use the high density mud "Fd" exiting from the first cyclone stage 23 or from a further cyclone stage, if present.

The plant according to the present invention can also comprise at least one container (35, 36, 37) inside which at least one liquid additive substance is stored, at least one pump (351, 361, 371) adapted for thrusting said at least one liquid additive substance, to be added and mixed with the mud during treatment.

Such insertion can occur in different portions of the pipe system, in the desired step of the treatment.

In the embodiment illustrated in FIG. 3 there is a first container 35, a second container 36 and a third container 37, each containing a different liquid additive substance, and the relative pumps (351, 361 and 371) adapted for thrusting the different liquid additive substances, which can be added to the mud during treatment.

In particular, the liquid additive substance contained in the first container 35 could be grout, that contained in the second container 36 could be a coagulating substance, and that contained in the third container 37 could be a polyelectrolyte.

The flow rate of the aforementioned liquid additive substances, which can optionally be added to the mud, is adjusted by at least one second flow rate measuring device 38, controlled through said computer-based control system. Such a computer-based control system is also adapted for deciding, depending on data received from the various measuring devices (38, 34) the amount of liquid additive substances to be added to the mud, as required.

In detail, on the delivery of said at least one pump (351, 361, 371) there is at least one second flow rate measuring device 38.

During drilling it is possible to add grout, for example contained in 35, to the mud entering the centrifuge in order to obtain a solid waste "Wf", which is discharged by the centrifuge 32, which can be used to stabilize the ground where necessary in building sites or in other areas outside the building site. Such solid waste "Wf" containing grout can also be used to make floorings inside the building site. For this purpose other stabilizing fluids can also be used, thus obtaining a "liquid on liquid" type mixing of the mud entering the centrifuge and of the stabilizing fluid. This mixture is then dried by the action of the centrifuge and the waste "Wf" that is obtained contains finer detritus and thanks to the effect of the grout is shovelable, whereas generally the solid wastes of centrifuges are not shovelable precisely due to the properties of the fine solids that are separated by the centrifuges.

During the excavation or drilling step it is possible to use the aforementioned coagulating substances and polyelectrolytes, which can for example be contained in the container 36 or in the container 37. Such substances are added to the mud inserted inside the centrifuge 32 in order to increase the separation performance of clays and slimes from the mud by the centrifuge 32 itself. Such an operation makes it possible to obtain a clean mud "F'" with very low clay and slime content.

During the excavation or drilling step the amounts used of coagulating substances and polyelectrolytes are monitored by suitable measuring devices, not illustrated, included in the plant, according to the present invention, and managed by the computer-based control system. Such measuring devices are adapted for monitoring the amount of such substances inside the mud, so that the computer-based control system adjusts their insertion in order to allow the complete reaction of such substances inside the mud, also preventing such coagulating substances and polyelectrolytes from reaching the main mud storage tank 11 or the excavation "S".

On the other hand, at the end of the building site period, or in any case after the excavation or drilling step, it is possible to use a greater quantity of coagulating substances and polyelectrolytes, in order to clarify the water, totally eliminating the clay and slime contained in the mud. In this way the separated water in which, according to legislation, the PH will have been modified can be dispersed in the clear water without additional clean-up costs.

The substances contained in the containers (35, 36, 37) can be injected into the plant at many points, simultaneously or independently. These injections are controlled and managed by the computer-based system that decides, depending on different environmental factors like, for example, temperature of the mud, quality of the water etc. . . . Indeed, these substances, depending on the aforementioned parameters, have different reaction times and it may be required to have different quantities or to be introduced into the plant in a predetermined point so that they remain within the mud for a predetermined time.

In the embodiment of the present invention there is no second tank with clean mud "F'" that is on the other hand generally present in plants of the type of FIG. 1 of the prior art.

Indeed, the present invention makes it possible to use the clean mud "F'", contained in the main mud storage tank 11, to carry out the casting of the foundation since the plant according to the present invention makes it possible to obtain a mud having low clay and slime content. The plant according to the present invention makes it possible to avoid the problem of excess clays and slimes that can deposit on the walls of the excavation "S", generating a thickness that is too great that is harmful for making the foundation as described earlier.

The plant, according to the present invention, also makes it possible to carry out the treatment of muds even in the absence of an excavation or drilling step to make the excavation "S", a thing that is essential for example at the end of the building site period or to continue the mud treatment operations also during the transient steps in which there is no drilling activity.

In addition to this, the high flexibility of the system illustrated in this invention also allows the centrifuge 32 to operate even when, for maintenance or other reasons, there is an interruption of the operation of the mud treatment plant 3 or the operator detaches the interconnection between it and the centrifuge 32.

Finally, the plant according to the present invention makes it possible to obtain the following immediate economic advantages:

use of a single centrifuge 32;

less refilling, in the mud, of clean water and consequent reduction in the usage costs of the plant;

reduction in bulk of the plant due to the use of a single centrifuge 32, which are notoriously very large machines;

elimination of the mud too full of fine solids, which cannot be used any more.

Indeed, such a mud that is too full of fine solids should be disposed of in special authorised dumps. In classical plants it is necessary to periodically take such a type of mud into said special dumps since the known types of plant are unable to control the content of fine solids inside the mud used for long periods.

Finally, the plant according to the present invention makes it possible to obtain a mud with constant properties over time making drilling more reliable.

The invention claimed is:

1. Plant for treating drilling muds for performing excavations or foundations, the plant comprising:
    a main mud storage tank containing clean mud ready to be conveyed to an excavation;
    a first grizzly screen to receive a mud filled with detritus;
    a mud processing hopper to receive a mud from the first grizzly screen;
    at least one cyclone stage, wherein each cyclone stage of the at least one cyclone stage comprises one or more cyclones connected in parallel, wherein each cyclone stage is provided with at least an inlet in which an entering mud to be treated is introduced and with at least a first outlet from which a lightened mud exits having a lower density than the entering mud, and with at least a second outlet from which a high density mud exits, such high density mud having a higher density than the entering mud; and
    a dewatering screen;
    wherein the main mud storage tank, the first grizzly screen, the mud processing hopper, the at least one cyclone stage, and the dewatering screen are connected together through pipes in such a way that the mud filled with detritus coming from the excavation is treated in order to obtain clean mud that is able to be reused once the obtained clean mud is returned to the excavation; and
    wherein said high density mud is drawn from the one or more cyclones of the at least one cyclone stage downstream of said second outlet and conveyed, at least partially, towards a centrifuge without any intermediate screening treatments between any of the one or more cyclones of the at least one cyclone stage and the centrifuge.

2. Plant according to claim 1, comprising at least a compensation manifold in a first portion of said pipes between said at least one cyclone stage and said centrifuge, the at least a compensation manifold adapted to contain said high density mud from the at least one cyclone stage.

3. Plant according to claim 2, wherein a first compensation manifold of the at least a compensation manifold comprises a tank;
    wherein said high density mud to be conveyed to the centrifuge is drawn from a bottom of the tank of the first compensation manifold; and
    wherein when the high density mud inside such first compensation manifold has reached a predetermined level in the tank, an exceeding part of such high density mud above the predetermined level is conveyed to said dewatering screen.

4. Plant according to claim 2, wherein, beside the high density mud coming from said at least one cyclone stage through a first pump, at least a portion of the clean mud from said main mud storage tank flows to said centrifuge through a second pump, wherein a mud mixture introduced into said centrifuge comprises the high density mud coming from said at least one cyclone stage through the first pump and the at least a portion of the clean mud from said main mud storage tank, the at least a portion of the clean mud from the main mud storage tank configured to control and counteract over time density changes of the mud mixture introduced into said centrifuge.

5. Plant according to claim 4, comprising a first measuring device on a first, delivery side of the first pump and second pump, the first measuring device adapted to measure an actual flow rate of the high density mud entering the centrifuge, and density, viscosity, and particle size range of the high density mud entering the centrifuge.

6. Plant according to claim 5, wherein said first measuring device is managed through a computer-based control system adapted to determine, based on data received from said first measuring device, how much high density mud has to be drawn from said at least one cyclone stage and how much clean mud has to be drawn from the main mud storage tank in order to introduce inside the centrifuge a type of the mud mixture having optimum density, for proper operation of the centrifuge.

7. Plant according to claim 4, wherein a suction of said first pump, second pump, and/or a pressurized line draws clean water to be mixed with the mud mixture in the centrifuge.

8. Plant according to claim 4, wherein the plant further comprises at least one container inside which at least one additive substance is stored, and at least a pump adapted to push said at least one additive substance to be added and mixed with the mud mixture in the centrifuge during treatment.

9. Plant according to claim 8, wherein such at least one additive substance comprises grout, coagulating substances, and/or polyelectrolytes.

10. Plant according to claim 8, wherein a flow rate of the at least one additive substance added to the mud mixture is adjusted by a pump in view of data provided by at least a second flow rate measuring device.

11. Plant according to claim 10, wherein said second flow rate measuring device and said pump is controlled through a computer-based control system adapted to determine, depending on data received from said second flow rate measuring device, an amount of the at least one additive substance to be added to the mud mixture.

12. Plant according to claim 9, wherein the at least one additive substance comprises grout contained in said at least one container, and wherein the grout is added to the mud mixture introduced in said centrifuge in order to obtain a solid waste discharged from the centrifuge.

13. Plant according to claim 9, wherein the at least one additive substance comprises coagulating substances or polyelectrolytes contained in said at least one container, and wherein the coagulating substances or polyelectrolytes are added in the mud mixture introduced in said centrifuge to enhance the performance of separating clays and slimes from the mud mixture of the centrifuge, or clarifying water to eliminate fine solids in the mud mixture.

14. Plant according to claim 1, comprising a second device for lacking flow compensation, the second device disposed between said at least one cyclone stage and the centrifuge, the second device for lacking flow compensation adapted to, when a second pump adapted to flow the clean mud from the main mud storage tank to the centrifuge is not functioning, mix the high density mud in a compensation manifold with a part of the lightened mud coming from the at least one cyclone stage.

15. Plant according to claim 1, wherein the at least one cyclone stage comprises a first cyclone stage and a second cyclone stage.

16. Plant according to claim 9, wherein a flow rate of the at least one additive substance added to the mud mixture is adjusted by a pump in view of data provided by at least a second flow rate measuring device.

17. Plant according to claim 16, wherein said second flow rate measuring device and said pump is controlled through a computer-based control system adapted to determine, depending on data received from said second flow rate measuring device, an amount of the at least one additive substance to be added to the mud mixture.

18. Plant according to claim 2, comprising a second device for lacking flow compensation, the second device disposed between said at least one cyclone stage and the centrifuge, the second device for lacking flow compensation adapted to, when a second pump adapted to flow the clean mud from the main mud storage tank to the centrifuge is not functioning, mix the high density mud in the compensation manifold with a part of the lightened mud coming from the at least the cyclone stage.

19. Plant according to claim 4, comprising a second device for lacking flow compensation, the second device disposed between said at least one cyclone stage and the centrifuge, the second device for lacking flow compensation adapted to, when the second pump is not functioning, mix the high density mud in the compensation manifold with a part of the lightened mud coming from the at least one cyclone stage.

20. Plant according to claim 1, wherein, beside the high density mud coming from said at least one cyclone stage through a first pump, at least a portion of the clean mud from said main mud storage tank flows to said centrifuge through a second pump, wherein a mud mixture introduced into said centrifuge comprises the high density mud coming from said at least one cyclone stage through the first pump and the at least a portion of the clean mud from said main mud storage tank, the at least a portion of the clean mud from the main mud storage tank configured to control and counteract over time density changes of the mud mixture introduced into said centrifuge.

* * * * *